No. 810,523. PATENTED JAN. 23, 1906.
H. H. EDGERLE.
NUT LOCK.
APPLICATION FILED JUNE 5, 1905.
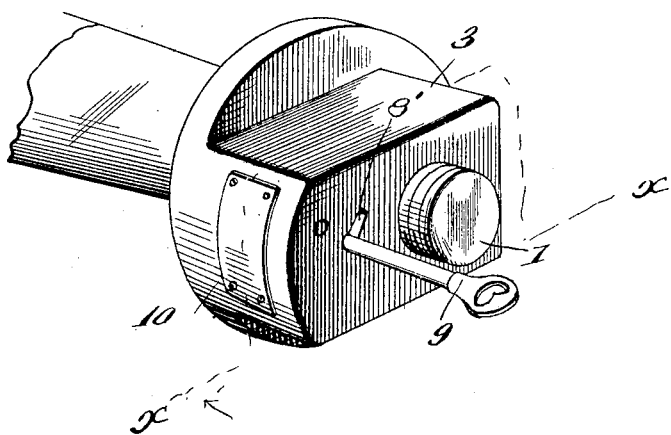
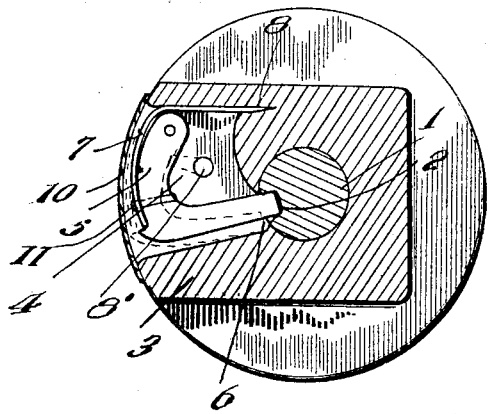
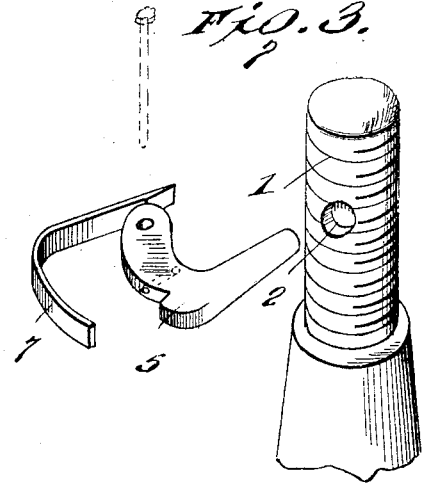
Inventor
H. H. Edgerle

UNITED STATES PATENT OFFICE.

HARRISON H. EDGERLE, OF CHERRYVALE, KANSAS.

NUT-LOCK.

No. 810,523.　　Specification of Letters Patent.　　Patented Jan. 23, 1906.

Application filed June 5, 1905. Serial No. 263,857.

*To all whom it may concern:*

Be it known that I, HARRISON H. EDGERLE, a citizen of the United States, residing at Cherryvale, in the county of Montgomery and State of Kansas, have invented certain new and useful Improvements in Nut-Locks, of which the following is a specification.

This invention relates to improvements in nut-locks; and it consists, essentially, of a locking member adapted to engage a recess in the bolt and operated by a key.

It has for its object to produce a device of this character which will be positive in its operation and simple and durable in construction.

Reference is to be had to the accompanying drawings, in which—

Figure 1 is a perspective view of the device. Fig. 2 is a transverse sectional view showing the operation of the locking member. Fig. 3 is a detail perspective view of the various parts.

Corresponding and like parts are referred to in the following description and indicated in all the views of the drawings by the same reference characters.

The device is illustrated as applied to an axle-spindle, and the numeral 1 designates the threaded portion thereof, which is provided with a recess 2. The nut 3, coöperating with the threaded portion 1, has a recess 4 in one side thereof, within which a dog 5 is pivoted. This dog 5 is elbow-shaped and the free end thereof passes through an opening 6, connecting the recess 4 and the usual threaded opening through the nut 3 to engage the recess 2 in the bolt. A piece of spring metal is bent so as to form a spring 7, one arm of which rests against a side of the recess 4 and engages a depression 8 in the bottom thereof, while the other arm bears against the dog 5 to force it automatically into the recess in the threaded portion of the bolt. It will be observed that a portion of the dog 5 is cut away to form a seat for the spring 7. A keyhole 8', passing into the recess 4, is located on the top of the nut, so that when a key 9 is inserted therethrough and turned the web portion thereof will engage an arm of the dog 5 and turn same so as to withdraw its free end from the threaded opening through the nut. A plate 10 is secured over the opening formed in the side of the nut by the recess 4 to exclude grit and dirt therefrom.

In operation the key 9 is placed in postion and turned so as to withdraw the free end of the dog 5. The nut is then screwed into position and the key withdrawn so as to allow the dog 5 to engage the recess 2 in the threaded portion 1. The process of removing the nut is just the reverse of the above. Owing to the great simplicity of construction, the device will be extremely unlikely to get out of order and any of its parts can be very easily replaced should they become broken. In practice it may be found desirable to secure the spring 7 to the dog 5 by means of a rivet or screw 11.

Having thus described the invention, what I claim as new, and desire to secure by Letters Patent, is—

In a nut-lock, the combination of a bolt having a recess therein, a nut having a threaded opening which coöperates with the bolt and also having a recess in a side thereof, said recess having communication with the threaded opening and having a keyhole leading therein from the top of the nut, an elbow-shaped locking member pivoted at one end within the recess, the free end thereof being adapted to engage the recess in the bolt to prevent the nut from working loose, a spring comprising two arms arranged at an angle to each other, one arm resting against a side of the recess and fitting within a slot at one end thereof, while the other arm bears against the locking member to hold same normally in engagement with the recess in the bolt, a plate to fit over the opening formed in the side of the nut by the recess, and a removable key for withdrawing the locking member.

In testimony whereof I affix my signature in presence of two witnesses.

HARRISON H. EDGERLE. [L. S.]

Witnesses:
　FRANK MCCLELLAN,
　C. C. THOMPSON.